United States Patent
Kosuge (10) Patent No.: US 9,736,470 B2
(45) Date of Patent: Aug. 15, 2017

(54) CALIBRATION APPARATUS, AND CONTROL METHOD THEREOF

(71) Applicant: CANON KABUSHIKI KAISHA, Tokyo (JP)

(72) Inventor: Takuya Kosuge, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 14/610,435

(22) Filed: Jan. 30, 2015

(65) Prior Publication Data
US 2015/0229918 A1 Aug. 13, 2015

(30) Foreign Application Priority Data
Feb. 10, 2014 (JP) ................................ 2014-023428

(51) Int. Cl.
*G01R 1/02* (2006.01)
*H04N 17/04* (2006.01)
*G06K 1/00* (2006.01)

(52) U.S. Cl.
CPC ......... *H04N 17/04* (2013.01); *G02B 2207/00* (2013.01); *G06K 1/00* (2013.01); *G06K 2207/00* (2013.01)

(58) Field of Classification Search
CPC ........ G06K 1/00; G06K 2207/00; G06T 1/00; G06T 2200/00; G01J 1/00; G02B 1/00; G02B 2207/00
See application file for complete search history.

(56) References Cited

U.S. PATENT DOCUMENTS

| | | | |
|---|---|---|---|
| 6,363,164 B1* | 3/2002 | Jones | G06K 9/033 194/206 |
| 2010/0188418 A1* | 7/2010 | Sakai | G01J 1/4204 345/594 |
| 2011/0148904 A1* | 6/2011 | Kotani | H04N 9/31 345/589 |
| 2012/0098926 A1* | 4/2012 | Kweon | G06T 1/00 348/36 |
| 2012/0176358 A1* | 7/2012 | Kaji | G09G 3/20 345/207 |
| 2013/0016082 A1* | 1/2013 | Coley | G09G 5/10 345/207 |
| 2013/0170615 A1* | 7/2013 | Wei | G01T 1/24 378/62 |

FOREIGN PATENT DOCUMENTS

JP 2005-249596 A 9/2005

* cited by examiner

*Primary Examiner* — Jermele M Hollington
*Assistant Examiner* — Temilade Rhodes-Vivour
(74) *Attorney, Agent, or Firm* — Cowan, Liebowitz & Latman, P.C.

(57) ABSTRACT

A calibration apparatus according to the present invention includes: a first acquisition unit configured to acquire a first measurement value, which is a measurement value of light from a screen of a display apparatus; a second acquisition unit configured to acquire a second measurement value, which is a measurement value of external light to the display apparatus; an allowable range determination unit configured to determine an allowable range of the first measurement value based on the second measurement value acquired by the second acquisition unit; and a measurement value determination unit configured to determine whether the first measurement value acquired by the first acquisition unit is a value within the allowable range determined by the allowable range determination unit.

25 Claims, 3 Drawing Sheets

CALIBRATION APPARATUS, AND CONTROL METHOD THEREOF

BACKGROUND OF THE INVENTION

Field of the Invention

The present invention relates to a calibration apparatus and a control method thereof.

Description of the Related Art

Calibration is a known technique that makes the display characteristics of a display apparatus closer to the desired characteristics. In calibration, an evaluation image (patch image) is displayed on a display apparatus, and the optical characteristics (e.g. brightness and colors on the screen) of the evaluation image are measured by a photometer. Then the image quality of the evaluation image is adjusted so that the measured optical characteristics become closer to the desired characteristics. For example, the image quality is adjusted by adjusting the values of parameters which are used for image processing. By repeating display, measurement and image quality adjustment of the evaluation image, the display characteristics of the display apparatus can be brought closer (or maintained at) the desired characteristics.

Prior art on calibration is disclosed, for example, in Japanese Patent Application Laid-open No. 2005-249596. Japanese Patent Application Laid-open No. 2005-249596 discloses a technique of performing calibration using a non-contact photometer, while considering the influence of external light (ambient light: light other than light from the display surface).

In order to perform appropriate (correct) calibration using an external photometer (photometer installed outside the display apparatus), the photometer must be correctly installed. In concrete terms, a correct measurement result (measurement result of light from the display surface) may not be acquired if the distance between the photometer and the display surface (screen) of the display apparatus is too far, or if the light receiving direction of the photometer is diagonal with respect to the display surface. Specifically, the light from the display surface may not reach the light receiving unit of the photometer, or external light may enter the light receiving unit, which makes it impossible to acquire a correct measurement result. If an incorrect measurement result is acquired, an incorrect calibration result is acquired. As a result, the display characteristics diverge from the desired characteristics because of this incorrect calibration. And if the user edits the image using the display apparatus of which display characteristics have diverged from the desired characteristics, the edited image may be different from the desired image. For example, the edited image may have colors that are different from the desired colors.

As a prior art that solves this problem, a technique to detect an installation failure of the photometer is known. For example, an expected range, which is a range of expected measurement values (range of measurement by the photometer), is set, and if a measured value outside the expected range (inappropriate value: abnormal value) is acquired, it is determined that an installation failure occurred to the photometer. If an installation failure occurs to the photometer, calibration is force-ended, whereby an incorrect calibration result reflected on the display characteristics can be prevented.

However if a narrow expected range is set to accurately detect an installation failure, a measurement value becomes a value outside the expected range only because of a slight change in the measurement value. This means that an installation failure can be accurately detected in a dark room environment, which is not influenced by external light very much, on the other hand, in an environment which is easily influenced by external light, an installation failure is frequently detected, and calibration is often force-ended.

SUMMARY OF THE INVENTION

The present invention provides a technique that allows highly accurate detection of an inappropriate calibration execution due to an installation failure of a photometer or the like, and also suppresses the frequent detection of inappropriate calibration execution.

The present invention in its first aspect provides a calibration apparatus configured to execute calibration of a display apparatus using a first measurement value, which is a measurement value of light from a screen of the display apparatus, the calibration apparatus comprising:

a first acquisition unit configured to acquire a first measurement value, which is a measurement value of light from the screen of the display apparatus;

a second acquisition unit configured to acquire a second measurement value, which is a measurement value of external light to the display apparatus;

an allowable range determination unit configured to determine an allowable range of the first measurement value based on the second measurement value acquired by the second acquisition unit; and a measurement value determination unit configured to determine whether the first measurement value acquired by the first acquisition unit is a value within the allowable range determined by the allowable range determination unit.

The present invention in its second aspect provides a method for controlling a calibration apparatus configured to execute calibration of a display apparatus, using a first measurement value, which is a measurement value of light from a screen of the display apparatus, the method comprising:

a first acquisition step of acquiring a first measurement value, which is a measurement value of light from the screen of the display apparatus;

a second acquisition step of acquiring a second measurement value, which is a measurement value of external light to the display apparatus;

an allowable range determination step of determining an allowable range of the first measurement value, based on the second measurement value acquired in the second acquisition step; and a measurement value determination step of determining whether the first measurement value acquired in the first acquisition step is a value within the allowable range determined in the allowable range determination step.

The present invention in its third aspect provides a non-transitory computer readable medium that stores a program, wherein the program causes a computer to execute the method.

The present invention makes possible highly accurate detection of inappropriate calibration execution due to an installation failure of a photometer or the like, and also suppresses frequent detection of inappropriate calibration execution.

Further features of the present invention will become apparent from the following de script ion of exemplary embodiments with reference to the attached drawings.

DESCRIPTION OF THE EMBODIMENTS

Example 1

Now a calibration apparatus according to Example 1 of the present invention and a control method thereof will be described. The calibration apparatus according to this example executes calibration of a display apparatus using a first measurement value, which is a measurement value of light from the screen of the display apparatus.

In this example, a case of the calibration apparatus that is disposed in the display apparatus will be described, but the calibration apparatus may be an apparatus that is separate from the display apparatus.

Figure 1:
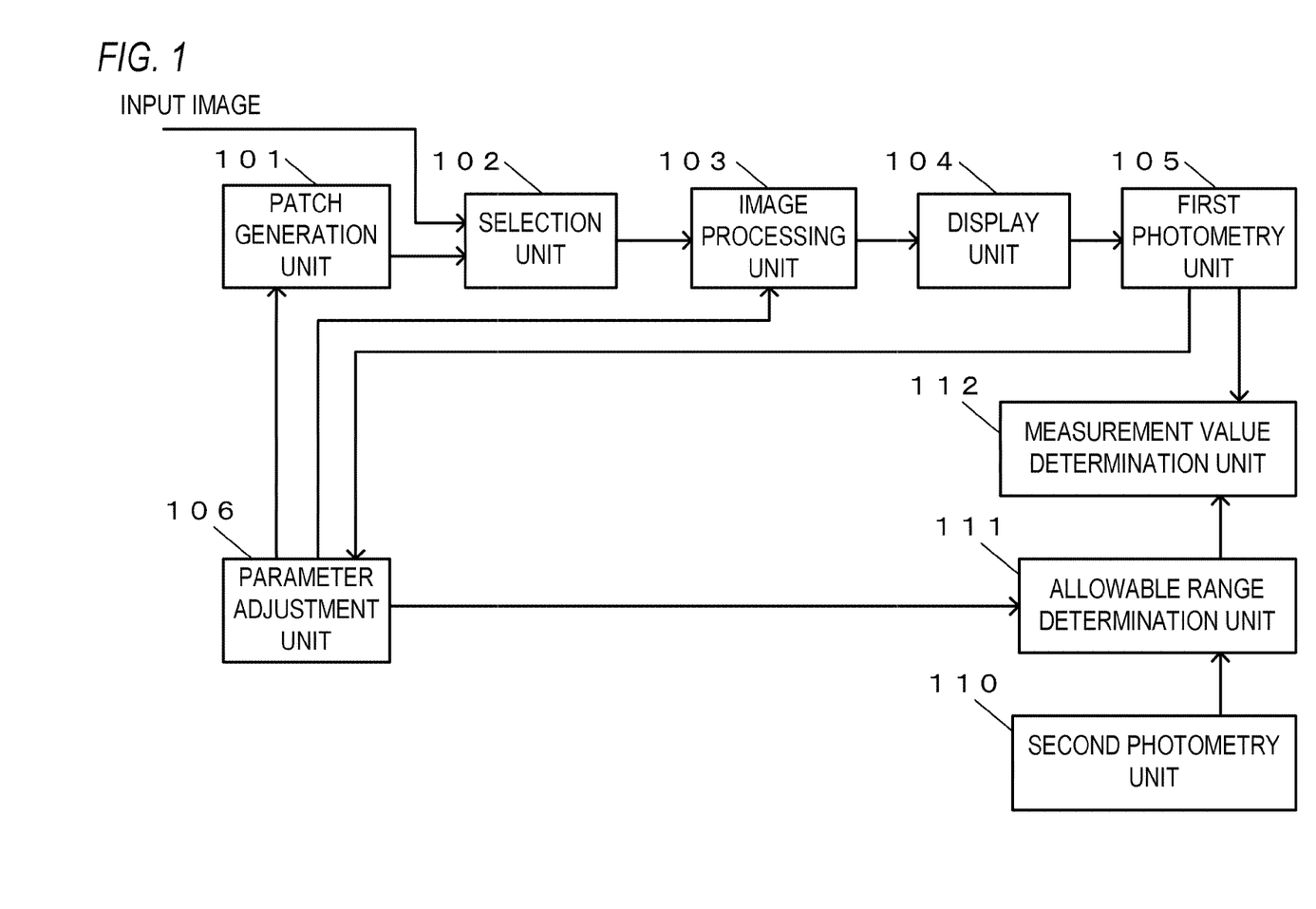
FIG. 1 is a diagram depicting an example of a functional configuration of a display apparatus according to Example 1.

FIG. 1 is a block diagram depicting an example of a functional configuration of the display apparatus according to this example.

A patch generation unit 101 generates a patch image which is a target of image quality evaluation (evaluation target) during calibration. In this example, an image, where each pixel value is the same as the other pixel values (image of which color and brightness are uniform), is generated as the patch image.

The patch image may be generated only when calibration is executed or may be generated at all times.

The evaluation target is not limited to a patch image. An evaluation image may be an icon, a photograph, an illustration or the like. And the patch image may have a plurality of pixel values. The pixel values of the evaluation target may or may not be fixed values determined by the manufacturer in advance. For example, a patch image having pixel values specified by the user may be generated as the evaluation target.

A selection unit 102 selects one of: an image inputted to the display apparatus according to this example (input image); and a patch image generated by the patch generation unit 101, and outputs the selected image to an image processing unit 103. In this example, a patch image is selected when calibration is executed, and an input image is selected otherwise.

If the calibration apparatus is an apparatus that is separate from the display apparatus, the selection unit 102 may be disposed in the calibration apparatus, or may be disposed on the display apparatus.

The image processing unit 103 generates a display image by performing predetermined image processing on an image outputted from the selection unit 102. The image processing unit 103 is an electronic circuit, such as an LSI, for example. The predetermined image processing is, for example, gain processing, offset processing, gamma correction processing (gamma conversion processing), and look up table (LUT) conversion processing. This example describes a case when the predetermined image processing includes at least gamma correction processing.

The predetermined image processing may be one type of image processing, or may include a plurality of types of image processing.

If the calibration apparatus is an apparatus that is separate from the display apparatus, the image processing unit 103 is disposed not in the calibration apparatus but in the display apparatus.

A display unit 104 displays the display image (image after the predetermined image processing is performed) generated by the image processing unit 103. A liquid crystal display panel, a plasma display panel, an organic EL display panel or the like can be used for the display unit 104.

In this example, values of the parameters used for a predetermined image processing (parameter values) are adjusted by calibration. By the selection unit 102 selecting an input image after calibration is executed, an image having a desired image quality can be acquired as a display image based on the input image (image displayed on screen).

A first photometry unit 105 is a first acquisition unit that acquires a first measurement value by measuring light from the screen (screen light) of the display apparatus according to this example. In this example, a measurement value of light emitted from an area where a patch image is displayed, out of the screen area, is acquired as the first measurement value. As the first measurement value, an XYZ tristimulus value of the screen light, for example, is acquired. The screen light is measured by a photosensor, for example.

The first measurement value may be acquired only when calibration is executed, or may be acquired at all times.

In this example, a case when the first photometry unit 105 measures the screen light is described, but the present invention is not limited to this. A first photometer apparatus that is separate from the calibration apparatus and the display apparatus according to this example may measure the screen light, and the first photometry unit 105 may acquire the first measurement value from the first photometer.

The first measurement value is not limited to an XYZ tristimulus value. For example, a YCbCr value, an RGB value or the like may be acquired as the first measurement value. As the first measurement value, a value that indicates only the brightness of screen light (e.g. Y value) may be acquired, or values that indicate only the colors of screen light (e.g. Cb value or Cr value) may be acquired.

When calibration is executed, a parameter adjustment unit 106 adjusts parameter values that are used for a predetermined image processing using the first measurement value acquired by the first photometry unit 105, so that the display characteristics of the display apparatus come close to the desired characteristics.

The parameter adjustment unit 106 instructs the patch generation unit 101 to generate a patch image when calibration is executed. In response to the instruction from the parameter adjustment unit 106, the patch generation unit 101 generates the patch image. Then the selection unit 102 selects the patch image when the patch generation unit 101 generates the patch image, and selects the input image otherwise.

When the calibration is executed, the parameter adjustment unit 106 may instruct the selection unit 102 to select a patch image.

In this example, the processing to make the display characteristics of the display apparatus come closer to the desired characteristics by displaying the patch image, acquiring the first measurement value, and adjusting the parameter values, corresponds to calibration.

By repeatedly displaying the patch image, acquiring the first measurement value, and adjusting the parameter values, the display characteristics of the display apparatus can be made closer to the desired characteristics.

The adjustment of the parameter values by using the first measurement value may be regarded as calibration.

The timing to execute the calibration is not especially limited. For example, calibration may be executed periodically, or may be executed at a timing when the user instructs calibration to be executed.

A second photometry unit 110 is a second acquisition unit that acquires the second measurement value by measuring external light of the display apparatus according to this example. As the second measurement value, an XYZ tristimulus value of the external light, for example, is acquired. The external light is measured by a photosensor, for example.

The second measurement value may be acquired only when calibration is executed, or may be acquired at all times.

In this example, the external light is measured by the second photometry unit 110, but the present invention is not limited to this. The external light may be measured by a second photometric apparatus that is separate from the calibration apparatus and the display apparatus according to this example, and the second photometry unit 110 may acquire the second measurement value from the second photometry apparatus.

The second measured value is not limited to the XYZ tristimulus value. For example, a YCbCr value, an RGB value or the like may be acquired as the second measurement value. As the second measurement value, a value that indicates only the brightness of the external light (e.g. Y value) may be acquired.

An allowable range determination unit 111 determines an allowable range of the first measurement value based on the second measurement value acquired by the second photometry unit 110. In concrete terms, the allowable range determination unit 111 acquires from the parameter adjustment unit 106: a pixel value of the patch image; a white target value which is a target value of the first measurement value of white; and a current gamma value that is used for gamma correction processing. The allowable range determination unit 111 also acquires the second measurement value from the second photometry unit 110. Then the allowable range determination unit 111 determines the allowable range using this acquired information. The allowable range is a range of an expected value of the first measurement value. The allowable range can also be regarded as an allowable range of the first measurement value.

To determine the allowable range, information other than the above mentioned information may be used. Further, to determine the allowable range, a part of the above mentioned information may not be used. For example, the allowable range may be determined based only on the second measurement value.

Moreover, the white target value may or may not be a fixed value that is predetermined by the manufacturer. For example, the white target value may be a value that the user can set or change. The calibration apparatus may include a determination unit that determines the white target value based on the second measurement value, the predetermined image processing or the like.

A measurement value determination unit 112 compares the first measurement value acquired by the first photometry unit 105 and the allowable range determined by the allowable range determination unit 111, and determines whether the first measurement value acquired by the first photometry unit 105 is an inappropriate value (e.g. abnormal value of which error is very large). In concrete terms, the measurement value determination unit 112 determines whether the first measurement value acquired by the first photometry unit 105 is a value within the allowable range determined by the allowable range determination unit 111. The measurement value determination unit 112 determines that the first measurement value is an appropriate value (not an inappropriate value) when the first measurement value acquired by the first photometry unit 105 is a value within the allowable range determined by the allowable range determination unit 111. Then the measurement value determination unit 112 determines that the first measurement value is an inappropriate value when the first measurement value acquired by the first photometry unit 105 is a value outside the allowable range determined by the allowable range determination unit 111.

If it is determined that the first measurement value is an inappropriate value, then calibration is force-ended by an instruction from a control unit (not illustrated), for example. Thereby even if an inappropriate (abnormal) calibration is executed because of the inappropriate first measurement value, reflection of the inappropriate calibration result on the display can be suppressed.

The calibration apparatus may include a notification unit that notifies the user with information on the determination result when it is determined that the first measurement value is an inappropriate value. For example, when it is determined that the first measurement value is an inappropriate value, the user may be notified that an inappropriate calibration was executed, instead of force-ending the calibration. In other words, the user may be notified that calibration was not appropriately (normally) executed. The user may be notified that the first measurement value is inappropriate, the installation environment of the display apparatus is inappropriate, and the installation position of the first photometry unit 105 (first photometer) is inappropriate, for example. Thereby the user may be prompted to re-execute calibration in an appropriate environment. Both a calibration force-end and a notification to the user may be performed. The user can then know the reason for a force-end to the calibration.

The user can be notified by voice or light, for example. In concrete terms, the user can be notified by an image (eg. message, icon) according to the content of the notification that is displayed on screen. Further, the user may be notified by a sound according to the content of the notification, or by a light source disposed outside the screen that uses a flashing pattern (including continuous lighting) or a color code according to the content of the notification.

Figure 2:
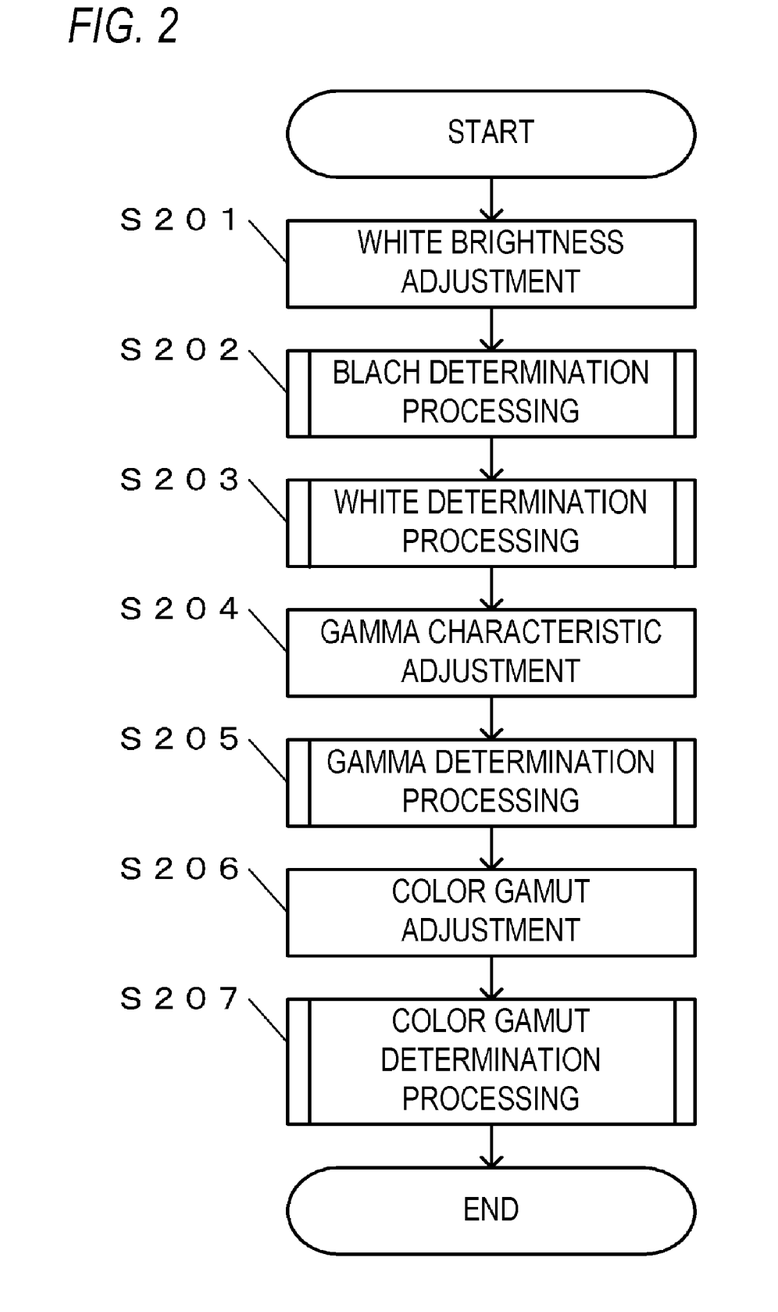
FIG. 2 is a flow chart depicting an example of a calibration processing flow according to Example 1.

An example of the calibration processing flow according to this example will be described with reference to FIG. 2. FIG. 2 is a flow chart depicting an example of the calibration processing flow according to this example.

First the display brightness (brightness on screen) of white is adjusted (S201). In this example, an RGB value, of which R value, G value and B value are 8-bit values respectively, is used as the pixel value. An RGB value, where the R value=G value=B value=255, is used as the white pixel value before executing a predetermined image processing. In S201, a patch image having the white pixel value is displayed, then a first measurement value of white is acquired, and parameter values are adjusted based on the first measurement value of white. For example, the parameter values are adjusted so that the first measurement value of white matches with the white target value. Thereby the display brightness of white is adjusted.

The parameter values may be adjusted only when it is determined that the first measurement value is not an inappropriate value.

A number of bits of the pixel value may be more less than 8 bits.

If the display apparatus can display colors, it is preferable to adjust the white balance (white display color (color on the screen)) as well in S201.

Then it is determined whether the first measurement value of black is an inappropriate value (S202: black determination processing). In this example, an RGB value, where R value=G value=B value=0, is used as the black pixel value. In S202, a patch image having the black pixel value is displayed, then the first measurement value of black is acquired, and it is determined whether the first measurement value of black is an inappropriate value.

In S202, it may be determined whether the first measurement value of black, acquired before the processing in S202, is an inappropriate value, without executing the processing to acquire the first measurement value of black.

Then it is determined whether the first measurement value of white is an inappropriate value (S203: white determination processing). In S203, a patch image having the white pixel value is displayed, then the first measurement value of white is acquired, and it is determined whether the first measurement value of white is an inappropriate value.

In S203, it may be determined whether the first measurement value of white, acquired in S201, is an inappropriate value, without executing the processing to acquire the first measurement value of white.

Then the gamma characteristic in the gamma correction processing is adjusted (S204). The gamma characteristic is characteristic that indicates the correspondence between the pixel value before gamma correction processing and the pixel value after gamma correction processing, for a plurality of achromatic colors from black to white. In this example, an RGB value, where R value=G value=B value, is used as an achromatic color pixel value before executing a predetermined image processing. In S204, a patch image having the achromatic color pixel value is displayed for a plurality of achromatic colors, and the first measurement values of the achromatic colors are acquired. Then, based on the plurality of first measurement values corresponding to the plurality of achromatic colors, a gamma value in the gamma correction processing is adjusted. Thereby the display brightness of the achromatic color is adjusted, and the gamma characteristic is adjusted.

The processing in S204 can be regarded as a processing to adjust the display brightness of an achromatic color.

In this example, an achromatic color, other than black and white, is referred to as "gray".

If the display apparatus can display color, it is preferable that the display color of the achromatic color is also adjusted in S204.

Then it is determined whether the gamma characteristic is inappropriate (S205: gamma determination processing). In the processing in S205, a patch image having an achromatic color pixel value is displayed for a plurality of achromatic colors, then the first measurement value of each achromatic color is acquired, and it is determined whether the first measurement value of the achromatic color is an inappropriate value.

The processing in S205 can be regarded as a processing to determine whether the first measurement value of the achromatic color is an inappropriate value.

In S205, it may be determined whether the first measurement value of the achromatic color acquired in S204 is an inappropriate value, without executing the processing to acquire the first measurement value of the achromatic color.

Then the color gamut of the display color is adjusted (S206).

In S206, a patch image having a red pixel value (an RGB value, where R value≠0 and G value=B value=0), is displayed, then the first measurement value of red is acquired, and the parameter values are adjusted based on the first measurement value of red. In this example, a patch image having an RGB value, where R value=255 and G value=B value=0, is displayed as the patch image having the red pixel value.

Furthermore, in S206, a patch image having a green pixel value (an RGB value, where G value≠0 and R value=B value=0), is displayed, then the first measurement value of green is acquired, and the parameter values are adjusted based on the first measurement value of green. In this example, a patch image having an RGB value, where G value=255 and R value=B value=0, is displayed as the patch image having the green pixel value.

Furthermore, in S206, a pitch image having a blue pixel value (an RGB blue, where B value≠0 and R value=G value=0), is displayed, then the first measurement value of blue is acquired, and the parameter values are adjusted based on the first measurement value of blue. In this example, a patch image having an RGB value, where B value=255 and R value=G value=0, is displayed as the patch image having the blue pixel value.

The processing in S206 can be executed only when the display apparatus can display colors.

Then it is determined whether the color gamut of the display color is an inappropriate color gamut (S207: color gamut determination processing). In S207, a patch image is displayed and the first measurement value is acquired for each of red, green and blue, and it is determined whether each first measurement value is an inappropriate value.

In S207, it may be determined whether the first measurement value acquired in S206 is an inappropriate value, without executing the processing to acquire the first measurement value. The processing in S207 can be executed only when the display apparatus can display colors.

Figure 3:
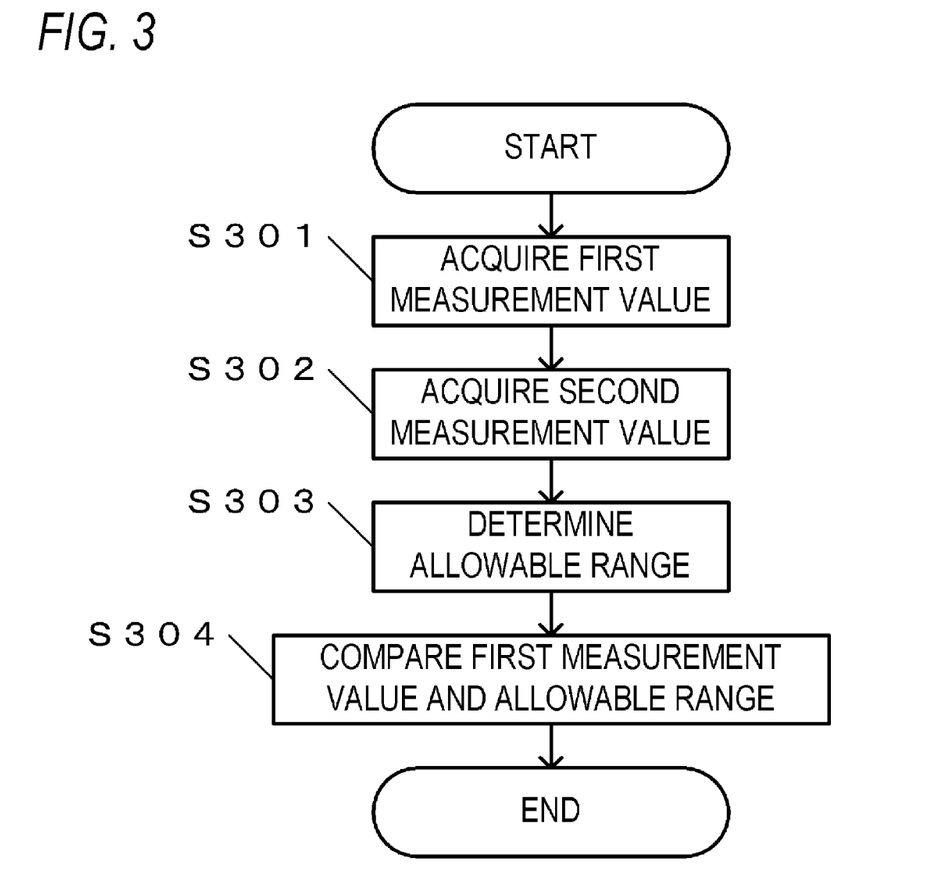
FIG. 3 is a flow chart depicting an example of a determination processing flow according to Example 1.

The processing flow of S202, S203, 205 and S207 in FIG. 2 will be described in detail with reference to FIG. 3. FIG. 3 is a flow chart depicting an example of the processing flow of S202, S203, S205 and S207.

<Black Determination Processing>

A processing flow of the black determination processing (processing in S202) will be described.

Initially the first photometry unit 105 acquires the first measurement value of black (S301). In concrete terms, the patch generation unit 101 generates a patch image having the black pixel value ((R value, G value, B value)=(0, 0, 0)). Then the generated patch image is displayed, and the first photometry unit 105 acquires, as the first measurement value of black, the measurement value of light from the area of the patch image having the black pixel value. The generated patch image may be displayed after the image processing unit 103 performs the image processing (image processing using the parameter values adjusted in S201), or may be displayed without performing the image processing by the image processing unit 103.

Then the second photometry unit 110 measures the external light, and acquires the second measurement value (S302).

Then the allowable range determination unit 111 determines the allowable range of black based on the second measurement value acquired in S302 (S303). In this example, an upper limit value Y_max of the range of the Y value, corresponding to the allowable range of black, is calculated using Expression 1 shown below. Then a lower limit value Y_min of the range of the Y value, corresponding to the allowable range of black, is calculated using Expression 2 shown below. In Expression 1, K denotes a coefficient that is set in advance, and L denotes brightness indicated by the second measurement value (brightness of external light) acquired in S302.

$$Y\_max = K \times L \quad \text{(Expression 1)}$$

$$Y\_min = 0 \quad \text{(Expression 2)}$$

The coefficient K is a value determined by experiment, for example, when the display apparatus is designed or manufactured. For example, in the environment in which luminance is about 500 lux, the second measurement value and the first measurement value of the patch image of the (R value, G value, B value)=(0, 0, 0) are acquired. In S301, if the generated patch image is displayed after the image processing unit 103 performs image processing (image processing using parameter values adjusted in S201), the first measurement value is acquired in a state after the display apparatus is calibrated in a dark room environment. In S301, if the generated patch image is displayed without performing the image processing by the image processing unit 103, the first measurement value is acquired in a state where the display apparatus is not calibrated (state where the image processing unit 103 outputs, as the output value, a value the same as the input value without making any changes in the input value). Then the coefficient K is calculated using Expression 3 shown below. In Expression 3, Y' denotes a Y value indicated by the acquired first measurement value, and L' denotes a brightness indicated by the acquired second measurement value.

$$K = 2 \times Y'/L' \quad \text{(Expression 3)}$$

The coefficient K may be determined by the calibration apparatus according to this example. For example, the calibration apparatus may calculate K using Expression 3, based on Y' and L', which are provided in advance. Alternatively, the calibration apparatus may acquire Y' and L' and calculate K based on the acquired Y' and L'.

After S303, the measurement value determination unit 112 determines whether the Y value indicated by the first measurement value acquired in S301 is a value that is the lower limit value Y_min or more and the upper limit value Y_max or less (S304). If the Y value indicated by the first measurement value acquired in S301 is the lower limit value Y_min or more and the upper limit value Y_max or less, the measurement value determination unit 112 determines that the first measurement value of black is not an inappropriate value. If the Y value indicated by the first measurement value acquired in S301 is a value that is less than the lower limit value Y_min or a value greater than the upper limit value Y_max, then the measurement value determination unit 112 determines that the first measurement value of black is an inappropriate value.

<White Determination Processing>

A processing flow of the white determination processing (processing in S203) will be described.

Initially the first photometry unit 105 acquires the first measurement value of white (S301). In concrete terms, the patch generation unit 101 generates a patch image having the white pixel value ((R value, G value, B value)=(255, 255, 255)). Then the generated patch image is displayed, and the first photometry unit 105 acquires, as the first measurement value of white, the measurement value of light from the area of the patch image having the white pixel value. The generated patch image may be displayed after the image processing unit 103 performs the image processing (image processing using parameters values adjusted in S201), or may be displayed without performing the image processing by the image processing unit 103.

Then the second photometry unit 110 measures the external light, and acquires the second measurement value (S302).

Then the allowable range determination unit 111 determines the allowable range of white based on the white target value and the second measurement value acquired in S302 (S303). The white target value is acquired from the parameter adjustment unit 106. In this example, an upper limit value Y_max of the range of the Y value corresponding to the allowable range of white is calculated using Expression 4 shown below. Then a lower limit value Y_min of the range of the Y value corresponding to the allowable range of white is calculated using Expression 5 shown below. In Expressions 4 and 5, K denotes a coefficient that is set in advance, L denotes brightness indicated by the second measurement value (brightness of external light) acquired in S302, and Y_255 denotes a Y value indicated by the white target value.

$$Y\_max = Y\_255 + K \times L \quad \text{(Expression 4)}$$

$$Y\_min = Y\_255 - K \times L \quad \text{(Expression 5)}$$

The coefficient K is a value determined by experiment, for example, when the display apparatus is designed or manufactured. For example, in an environment of which luminance is about 500 lux, the second measurement value and the first measurement value of the patch image of (R value, G value, B value)=(255, 255, 255) are acquired. In S301, if the generated patch image is displayed after the image processing unit 103 performs image processing (image processing using parameter values adjusted in S201), the first measurement value is acquired in a state after the display apparatus is calibrated in a dark room environment. In S301, if the generated patch image is displayed without performing the image processing by the image processing unit 103, the first measurement value is acquired in the state where the display apparatus is not calibrated (state where the image processing unit 103 outputs as the output value, a value the same as the input value without making any changes to the input value). Then the coefficient K is calculated using Expression 6 shown below. In Expression 6, Y' denotes a Y value indicated by the acquired first measurement value, L' denotes brightness indicated by the acquired second measurement value, and Y_255' denotes a Y value indicated by the white target value corresponding to the dark room environment. |Y'−Y_255'| is an absolute value of Y'−Y_255'.

$$K = 2 \times |Y' - Y\_255'|/L' \quad \text{(Expression 6)}$$

The coefficient K may be determined by the calibration apparatus according to this example. For example, the calibration apparatus may calculate K using Expression 6, based on Y', L' and Y_255'. Alternatively, the calibration apparatus may acquire Y', L' and Y_255' and calculate K based on the acquired Y', L' and Y_255'.

After S303, the measurement value determination unit 112 determines whether the Y value indicated by the first measurement value acquired in S301 is a value that is the lower limit value Y_min or more and the upper limit value Y_max or less (S304). If the Y value indicated by the first measurement value acquired in S301 is the lower limit value Y_min or more and the upper limit value Y_max or less, the measurement value determination unit 112 determines that the first measurement value of white is not an inappropriate value. If the Y value indicated by the first measurement value acquired in S301 is less than the lower limit value Y_min or greater than the upper limit value Y_max, then the measurement value determination unit 112 determines that the first measurement value of white is an inappropriate value.

<Gamma Determination Processing>

A processing flow of the gamma determination processing (processing in S205) will be described. A processing of one achromatic color will be described below.

Initially the first photometry unit 105 acquires the first measurement value of an achromatic color (S301). In concrete terms, the patch generation unit 101 generates a patch image having the achromatic color pixel value ((R value, G value, B value)=(i, i, i)). Then the generated patch image is displayed, and the first photometry unit 105 acquires, as the first measurement value of the achromatic color, the measurement value of light from the area of the patch image having the achromatic color pixel value. The generated patch image may be displayed after the image processing unit 103 performs the image processing (image processing using parameter values adjusted in S201 and S204), or may be displayed without performing the image processing by the image processing unit 103. In this example, i is a value that is 0 or more and 255 or less.

Then the second photometry unit 110 measures the external light and acquires the second measurement value (S302).

Then the allowable range determination unit 111 determines the allowable range of the achromatic color based on the gradation value of the achromatic color (i), the gradation value of white (255), the white target value, the current gamma value, and the second measurement value acquired in S302 (S303). The white target value and the current gamma value are acquired from the parameter adjustment unit 106.

Initially the allowable range determination unit 111 determines the target value of the first measurement value based on a predetermined image processing (target determination processing). In concrete terms, the target value of the first measurement value of the achromatic color (achromatic color target value) is determined based on the gradation value of the achromatic color (i), the gradation value of white (255), the white target value, and the current gamma value. To be more specific, the Y value Y_i indicated by the achromatic color target value is calculated using Expression 7 shown below. In Expression 7, i denotes the gradation value of the achromatic color, γ denotes a current gamma value, and Y_255 denotes the Y value indicated by the white target value.

$$Y\_i=(i/255)^\gamma \times Y\_255 \quad \text{(Expression 7)}$$

Then the allowable range determination unit 111 determines the allowable range of the achromatic color based on the achromatic color target value and the second measurement value acquired in S302. In this example, the upper limit value Y_max of the range of the Y value corresponding to the allowable range of the achromatic color is calculated using Expression 8 shown below. Then the lower limit value Y_min of the range of the Y value corresponding to the allowable range of the achromatic color is calculated using Expression 9 shown below. In Expressions 8 and 9, K denotes a coefficient that is set in advance, L denotes brightness indicated by the second measurement value (brightness of external light) acquired in S302, and Y_i denotes a Y value indicated by the achromatic color target value.

$$Y\_max=Y\_i+K \times L \times Y\_i \quad \text{(Expression 8)}$$

$$Y\_min=Y\_i-K \times L \times Y\_i \quad \text{(Expression 9)}$$

The processing to calculate Y_i is unnecessary if the achromatic color target value is provided in advance.

The coefficient K is a value determined by experiment, for example, when the display apparatus is designed or manufactured. For example, in an environment of which luminance is about 500 lux, the second measurement value and the first measurement value of the patch image of (R value, G value, B value)=(255, 255, 255) are acquired. In S301, if the generated patch image is displayed after the image processing unit 103 performs image processing (image processing using parameter values adjusted in S201 and S204), the first measurement value is acquired in a state after the display apparatus is calibrated in a dark room environment. In S301, if the generated patch image is displayed without performing the image processing by the image processing unit 103, the first measurement value is acquired in the state where the display apparatus is not calibrated (state where the image processing unit 103 outputs, as the output value, a value the same as the input value without making any changes in the input value). Then the coefficient K is calibrated using Expression 10 shown below. In Expression 10, Y' denotes a Y value indicated by the acquired first measurement value, L' is brightness indicated by the acquired second measurement value, and Y_255' is a Y value indicated by the white target value corresponding to the dark room environment. |Y−Y_255'| denotes an absolute value of Y−Y_255'.

$$K=2 \times |Y-Y\_255'|/(L' \times Y\_255') \quad \text{(Expression 10)}$$

The coefficient K may be determined by the calibration apparatus according to this example. For example, the calibration apparatus may calculate K using Expression 10, based on Y', L' and Y_255', which are provided in advance. Alternatively, the calibration apparatus may acquire Y', L' and Y_255' and calculate K based on the acquired Y', L' and Y_255'.

After S303, the measurement value determination unit 112 determines whether the Y value, indicated by the first measurement value acquired in S301, is a value that is the lower limit value Y_min or more and the upper limit value Y_max or less (S304). If the Y value indicated by the first measurement value acquired in S301 is the lower limit value Y_min or more and the upper limit value Y_max or less, the measurement value determination unit 112 determines that the first measurement value of the achromatic color is not an inappropriate value. If the Y value indicated by the first measurement value acquired in S301 is less than the lower limit value Y_min or greater than the upper limit value Y_max, then the measurement value determination unit 112 determines that the first measurement value of the achromatic color is an inappropriate value.

The processing operations in S301 to S304 may be executed only for one achromatic color, or the processing operations in S301 to S304 may be repeatedly executed for a plurality of achromatic colors. For example, the processing operations in S301 to S304 may be executed for 256 achromatic colors (i=0, 1, 2, . . . 255) repeatedly 256 times. Then it may be determined that the gamma characteristic is inappropriate if a number of achromatic values, of which first measurement value is determined inappropriate, is a threshold or more, and that the gamma characteristic is not inappropriate if a number of achromatic colors, of which first measurement value is determined inappropriate, is less than the threshold. For the threshold, a 1 or greater integer can be used. Further, only whether the first measurement value of an achromatic color is an inappropriate value may be determined, without determining whether the gamma characteristic is inappropriate.

<Color Gamut Determination Processing>

A processing flow of the color gamut determination processing (processing in S207) will be described.

Initially the first photometry unit 105 acquires the first measurement value of red (S301). In concrete terms, the patch generation unit 101 generates a patch image having the red pixel value ((R value, G value, B value)=(255, 0, 0)). Then the generated patch image is displayed, and the first photometry unit 105 acquires, as the first measurement value of red, the measurement value of light from the area of the patch image having the red pixel value. The generated patch image may be displayed after the image processing unit 103 performs the image processing (image processing using parameter values adjusted in S201, S204 and S206), or may be displayed without performing the image processing by the image processing unit 103.

Then the second photometry unit 110 measures the external light and acquires the second measurement value (S302).

Then the allowable range determination unit 111 determines the allowable range of red based on the white target value and the second measurement value acquired in S302 (S303). Here the allowable range is determined for the X value, the Y value and the Z value respectively. In concrete terms, the range of the Y value, the range of the X value and the range of the Z value, corresponding to the allowable range of red, are determined respectively.

<<How to Determine the Range of the Y Value>>

In this example, the upper limit value Y_max of the range of the Y value corresponding to the allowable range of red is calculated using Expression 11 shown below. Then the lower limit value Y_min of the range of the Y value corresponding to the allowable range of red is calculated using Expression 12 shown below. In Expressions 11 and 12, K_Y denotes a coefficient that is set in advance, and L denotes brightness indicated by the second measurement value (brightness of external light) acquired in S302. YR_255 denotes a Y value indicated by the red target value, which is the target value of the first measurement value of red.

$$Y\_max = YR\_255 + K\_Y \times L \quad \text{(Expression 11)}$$

$$Y\_min = YR\_255 - K\_Y \times L \quad \text{(Expression 12)}$$

The coefficient K_Y is a value determined by experiment, for example, when the display apparatus is designed or manufactured. For example, in an environment of which luminance is about 500 lux, the second measurement value and the first measurement value of the patch image of (R value, G value, B value)=(255, 0, 0) are acquired. In S301, if the generated patch image is displayed after the image processing unit 103 performs image processing (image processing using parameter values adjusted in S201, S204 and S206), the first measurement value is acquired after the display apparatus is calibrated in a dark room environment. In S301, if the generated patch image is displayed without performing the image processing by the image processing unit 103, the first measurement value is acquired in the state where the display apparatus is not calibrated (state where the image processing unit 103 outputs, as the output value, a value the same as the input value without making any changes in the input value). Then the coefficient K_Y is calculated using Expression 13 shown below. In Expression 13, Y' denotes a Y value indicated by the acquired first measurement value, L' denotes brightness indicated by the acquired second measurement value, and YR_255' denotes a Y value indicated by the red target value corresponding to a dark room environment. |Y'−YR_255'| is an absolute value of Y'−YR_255'.

$$K\_Y = 2 \times |Y' - YR\_255'| / L' \quad \text{(Expression 13)}$$

<<How to Determine the Range of the X Value>>

In this example, the upper limit value X_max of the range of the X value corresponding to the allowable range of red is calculated using Expression 14 shown below. Then the lower limit value X_min of the range of the X value corresponding to the allowable range of red is calculated using Expression 15 shown below. In Expressions 14 and 15, K_X denotes a coefficient that is set in advance, L denotes brightness indicated by the second measurement value (brightness of external light) acquired in S302, and XR_255 denotes an X value indicated by the red target value.

$$X\_max = XR\_255 + K\_X \times L \quad \text{(Expression 14)}$$

$$X\_min = XR\_255 - K\_X \times L \quad \text{(Expression 15)}$$

The coefficient K_X is a value determined by experiment, for example, when the display apparatus is designed or manufactured. The coefficient K_X can be calculated by a method similar to the case of the coefficient K_Y. In concrete terms, the coefficient K_X can be calculated using an expression generated by substituting Y' of Expression 13 with an X value indicated by the first measurement value, and substituting YR-255' of Expression 13 with an X value indicated by the red target value corresponding to a dark room environment.

<<How to Determine the Range of the Z Value>>

In this example, the upper limit value Z_max of the range of the Z value corresponding to the allowable range of red is calculated using Expression 16 shown below. Then the lower limit value Z_min of the range of the Z value corresponding to the allowable range of red is calculated using Expression 17 shown below. In Expressions 16 and 17, K_Z denotes a coefficient that is set in advance, L denotes brightness indicated by the second measurement value (brightness of external light) acquired in S302, and ZR_255 denotes a Z value indicated by the red target value.

$$Z\_max = ZR\_255 + K\_Z \times L \quad \text{(Expression 16)}$$

$$Z\_min = ZR\_255 - K\_Z \times L \quad \text{(Expression 17)}$$

The coefficient K_Z is a value determined by experiment, for example, when the display apparatus is designed or manufactured. The coefficient K_Z can be calculated by a method similar to the case of the coefficient K_Y. In concrete terms, the coefficient K_Z can be calculated using an expression generated by substituting Y' of Expression 13 with a Z value indicated by the first measurement value, and substituting YR_255' of Expression 13 with a Z value indicated by the red target value corresponding to a dark room environment.

After S303, the measurement value determination unit 112 determines whether the first measurement value acquired in S301 is a value within the allowable range determined in S303 (S304). In concrete terms, it is determined whether the Y value indicated by the first measurement value acquired in S301 is the lower limit value Y_min or more and the upper limit value Y_max or less. In the same manner, it is determined whether the X value indicated by the first measurement value acquired in S301 is the lower limit value X_min or more and the upper limit value X_max or less. Then it is determined whether the Z value indicated by the first measurement value acquired in S301 is the lower limit value Z_min or more and the upper limit value Z_max or less. If a number of values, out of the X value, Y value and Z value indicated by the first measurement value acquired in S301, that is outside the range determined in S303, is less than a threshold, the measurement value determination unit 112 determines that the first measurement value or red is not an inappropriate value. Then if a number of values, out of the X value, Y value and Z value indicated by the first measurement value acquired in S301, that is outside the range determined in S303, is the threshold or more, the measurement value determination unit 112 determines that the first measurement value of red is an inappropriate value. For the threshold, a 1 or greater integer can be used.

Processing similar to the processing of red is executed for green and blue as well.

The color gamut of the display color may be determined as an inappropriate color gamut, if a number of colors, out of red, green and blue, of which the first measurement value is determined as an inappropriate value, is the threshold or more. The color gamut of the display color may be determined as a color gamut that is not an inappropriate color gamut if a number of colors, of which the first measurement value is determined as an inappropriate value, is less than the threshold. For the threshold, a 1 or greater integer can be used. It may be determined only whether the first measurement value of red is an inappropriate value, whether the first measurement value of green is an inappropriate value, and whether the first measurement value of blue is an inappropriate value, without determining whether the color gamut of the display color is an in appropriate color gamut.

The red target value, the greet target value (target value of the first measurement value of green) and the blue target value (target value of the first measurement value of blue) may or may not be fixed values determined by the manufacturer. For example, the red target value may be a value which the user can set and change. The calibration apparatus may include a determination unit that determines the red target value based on the second measurement value, a predetermined image processing or the like.

The coefficients K_Y, K_X and K_Z may be determined by the calibration apparatus according to this example. For example, the calibration apparatus may calculate K_Y using Expression 13, based on Y', L' and YR_255', which are provided in advance. Alternatively, the calibration apparatus may acquire Y', L' and YR_255' and calculate K_Y based on the acquired Y', L' and YR_255'.

As described above, according to this example, the allowable range of the measurement value of the screen light (first measurement value) is determined based on the measurement value of the external light of the display apparatus (second measurement value). In concrete terms, a wider allowable range is determined as the external light is brighter. Thereby execution of inappropriate calibration (acquisition of an inappropriate first measurement value), due to an installation failure of a photometer or the like, can be accurately detected, and the frequent detection of inappropriate calibration execution can be suppressed.

In the processing in S202, the allowable range of the first measurement value of black is determined based only on the second measurement value. Thereby detection of an inappropriate value in error is suppressed, and it can be accurately detected if the first measurement value of black is an inappropriate value.

In the processing in S203, S205 and S207, the allowable range is determined based on the target value of the first measurement value and the second measurement value. Thereby detection of an inappropriate value in error is suppressed, and it can be accurately detected if the first measurement value is an inappropriate value.

In concrete terms, in the processing in S203, the allowable range of the first measurement value of white is determined based on the white target value and the second measurement value. Thereby detection of an inappropriate value in error is suppressed, and it can be accurately detected if the first measurement value of white is an inappropriate value.

In the processing in S205, the allowable range of the first gradation value of an achromatic color is determined based on the achromatic color target value and the second measurement value. Thereby detection of an inappropriate value in error is suppressed, and it can be accurately detected if the first measurement value of the achromatic color is an inappropriate value. In the processing in S205, the achromatic color target value is determined based on the gradation value of the achromatic color, the gradation value of white, the current gamma value, and the white target value. For the allowable range of gray, which is one achromatic color, a wider allowable range is determined as the white target value is higher.

In the processing in S207, the allowable range of the first measurement value of red is determined based on the red target value and the second measurement value, the allowable range of the first measurement value of green is determined based on the green target value and the second measurement value, and the allowable range of the first measurement value of blue is determined based on the blue target value and the second measurement value. Thereby detection of an inappropriate value in error is suppressed, and it can be accurately detected if the first measurement value of red is an inappropriate value, the first measurement value of green is an inappropriate value, or the first measurement value of blue is an inappropriate value.

In the description of this example, the black determination processing, the white determination processing, the gamma determination processing and the color gamut determination processing are performed, but the determination processing is not limited to these processing operations. Further, it may not be necessary for all or apart of the above mentioned four determination processing operations to be executed. For example, the first measurement value of yellow may be acquired in a state where the patch image, having a yellow pixel value, is displayed. Then as the determination processing, a processing to determine whether the first measurement value of yellow is an inappropriate value may be executed. Furthermore, the parameter values may be adjusted based on the first measurement value of yellow, so that the display brightness and the display color of yellow become desired values.

The color of the patch image is not limited to white, black, gray, red, blue, green or yellow. The color of the patch image can be any color.

In the description of this example, it is determined whether the first measurement value is an inappropriate value in the black determination processing, the white determination processing, and the gamma determination processing, using the brightness value (Y value) indicated by the first measurement value, but the determination method is not limited to this. For example, it may be determined whether the first measurement value is an inappropriate value, using the X value indicated by the first measurement value, or it may be determined whether the first measurement value is an inappropriate value using the Z value indicated by the first measurement value. If a plurality of values indicated by the first measurement value is used, the accuracy of determining whether the first measured value is an inappropriate value can be improved. For example, the determination accuracy can be improved if the X value, the Y value and the Z value are used, just like the above mentioned color gamut determination processing.

In the description of this example, it is determined whether the first measurement value is an inappropriate value in the color gamut determination processing using the X value, the Y value and the Z value indicated by the first measurement value, but the determined method is not limited to this. For example, it may be determined whether the first measurement value is an inappropriate value using one or two of the X value, the Y value and the Z value indicated by the first measurement value.

In the description of this example, it is determined whether the first measurement value is an inappropriate value, using the XYZ tristimulus value indicated by the first measurement value, but the determination method is not limited to this. For example, it may be determined whether the first measurement value is an inappropriate value using the RGB value or the YCbCr value indicated by the first measurement value.

The sequence of the processing operations in S201 to S207 is not limited to the sequence shown in FIG. 2. For example, the processing in S203, the processing in S205, the processing in S207 or the like may be executed before the processing in S202. In the description of this example, the image quality adjustment processing (the processing in S201, processing in S204, processing in S206 or the like, i.e. a part of calibration) and the determination processing are alternately executed in this sequence, but the determination processing may be executed after all the image quality adjustment processing operations are executed. For example, the processing operations in S201 to S207 may be executed in the sequence of the processing in S201, the processing in S204, the processing in S206, the processing in S202, the processing in S203, the processing in S205, and the processing in S207. The image quality adjustment processing may be executed after all the determination processing operations are executed. The determination processing and the image quality adjustment processing may be alternately executed in this sequence.

Example 2

Now a calibration apparatus according to Example 2 of the present invention, and a control method thereof, will be described.

Surface processing may be performed on the screen, and the degree of the influence of the external light on the first measurement value depends on the surface processing, and it is preferable to determine a wider allowable range as the degree of influence of the external light on the first measurement value is greater. Therefore in this example, an example of determining the allowable range, also considering the type of surface processing performed on the screen, will be described.

In concrete terms, if glare processing has been performed on the screen, then the external light is more easily reflected on the screen, and the external light more easily influences the first measurement value, compared with the case of a screen on which non-glare processing has been performed. Therefore in this example, a case of determining a wider allowable range, when glare processing has been performed, compared with the case of a screen on which non-glare processing has been performed, will be described.

Description on the configuration and the functions the same as Example 1 is omitted.

The configuration and the processing flow of the calibration apparatus (display apparatus) according to this example are essentially the same as Example 1 (FIGS. 1 to 3). The difference of this example from Example 1 is the method of determining the allowable range (processing in S303 in FIG. 3).

In S303, if glare processing has been performed on the screen, the allowable range is determined using a coefficient K, which is larger than the case when non-glare processing has been performed on the screen. For example, in the case of a display apparatus where non-glare processing has been performed on the screen, the allowable range is determined in the black determination processing, using the coefficient K calculated by Expression 3. In the case of a display apparatus where glare processing has been performed on the screen, the allowable range is determined in the black determination processing, using the coefficient K calculated by Expression 18 shown below. Therefore, when glare processing has been performed on the screen, a wider allowable range can be determined than the case when non-glare processing has been performed on the screen.

$$K = 3 \times Y'/L' \quad \text{(Expression 18)}$$

Instead of the coefficient K, expressions to calculate the allowable range (expressions to calculate the upper limit value and the lower limit value of the allowable range) may be different, depending or whether glare processing has been performed on the screen or whether non-glare processing has been performed on the screen.

If the calibration apparatus is installed in the display apparatus, an appropriate coefficient K (or expression to calculate the coefficient K) can be recorded in the calibration apparatus (a storage unit of the calibration apparatus) in advance when the display apparatus is manufactured, for example. The appropriate coefficient K and the expression to calculate the coefficient K can be determined when the display apparatus is designed or manufactured.

In the case when the calibration apparatus is disposed separate from the display apparatus, if the display apparatus connected to the calibration apparatus (calibration target display apparatus: target display apparatus) is switched to another display apparatus, the type of surface processing performed on the screen of the target display apparatus may change. For example, if a target display apparatus is switched to another type of display apparatus (e.g. switching from a liquid crystal display apparatus to a plasma display apparatus), the type of the surface processing performed on the screen of the target display apparatus may change. Even if the calibration apparatus is installed in the display apparatus, the type of surface processing may change because of adhering a surface film, replacing the display unit or the like. For example, the type of surface processing may change when a display unit of a display apparatus is replaced with another type of display unit (e.g. replacement of a liquid crystal display panel with a plasma display panel).

In such a case, it is preferable to acquire the processing type information, which indicates a type of surface processing performed on the screen of the target display apparatus (processing type acquisition processing). Then based on this processing type information, it can be determined whether glare processing has been performed on the screen, or whether non-glare processing has been performed on the screen (processing type determination processing). If the method for determining the allowable range is switched according to the result of the processing type determination processing, an appropriate allowable range, considering the type of surface processing, can be determined.

The processing type acquisition processing and the processing type determination processing may be performed by any functional unit of the calibration apparatus. The calibration apparatus may further include a processing type acquisition unit that performs the processing type acquisition processing and a processing type determination unit that performs the processing type determination processing.

The method of the processing type acquisition processing is not especially limited. For example, if the processing type information is recorded in the target display apparatus in advance, the processing type information can be acquired from the target display apparatus. Alternatively, the type of the surface processing performed on the screen of the target display apparatus may prompt the user with a question, and the result of the user response may be acquired as processing type information. To question the user, an on-screen display (OSD) image may be displayed on the screen of the target display apparatus. As mentioned above, the type of the surface processing may change because of adhering surface film. Therefore, it is preferable that the processing type acquisition processing is performed when calibration is executed.

According to this example, the allowable range is determined considering the type of the surface processing performed on the screen as well. Thereby an even more appropriate allowable range than Example 1 can be determined, hence inappropriate calibration execution can be more accurately detected, and frequent detection of inappropriate calibration execution can be further suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-023428, filed on Feb. 10, 2014, which is hereby incorporated by reference herein in its entirety.

What is claimed is:

1. A calibration apparatus configured to execute calibration of a display apparatus using a first measurement value, which is a measurement value of light from a screen of the display apparatus, the calibration apparatus comprising:
a first acquisition unit configured to acquire a first measurement value, which is a measurement value of light from the screen of the display apparatus;
a second acquisition unit configured to acquire a second measurement value, which is a measurement value of external light to the display apparatus;
an allowable range determination unit configured to determine an allowable range of the first measurement value based on the second measurement value acquired by the second acquisition unit; and
a measurement value determination unit configured to determine whether the first measurement value acquired by the first acquisition unit is a value within the allowable range determined by the allowable range determination unit,
wherein the measurement value determination unit determines that the first measurement value is an inappropriate value in a case where the first measured value acquired by the first acquisition unit is a value outside the allowable range determined by the allowable range determination unit, and determines that the first measurement value is an appropriate value in a case where the first measurement value acquired by the first acquisition unit is a value within the allowable range determined by the allowable range determination unit.

2. The calibration apparatus according to claim 1, wherein the second measurement value is a value to indicating brightness of the external light, and
the allowable range determination unit determines a wider allowable range as the external light is brighter.

3. The calibration apparatus according to claim 1, wherein the allowable range determination unit determines the allowable range, based on a target value of the first measurement value and the second measurement value acquired by the second acquisition unit.

4. The calibration apparatus according to claim 3, wherein the display apparatus is an apparatus configured to perform predetermined image processing on an image, and display the image after the predetermined image processing is performed, and
the calibration apparatus further comprises a target determination unit configured to determine a target value of the first measurement value, based on the predetermined image processing.

5. The calibration apparatus according to claim 4, wherein the predetermined image processing includes gamma correction processing, and
the target determination unit determines a target value of the first measurement value of gray, based on a gradation value of gray, a gradation value of white, a gamma value of the gamma correction processing, and a white target value, which is a target value of the first measurement value of the white.

6. The calibration apparatus according to claim 5, wherein the white target value is a predetermined value.

7. The calibration apparatus according to claim 5, wherein the allowable range determination unit determines a wider allowable range of the gray as the white target value is greater.

8. The calibration apparatus according to claim 1, wherein the first measurement value is an XYZ tristimulus value, and
the allowable range determination unit determines an allowable range for an X value, a Y value and a Z value respectively, based on the second measurement value.

9. The calibration apparatus according to claim 1, wherein the allowable range determination unit determines a wider allowable range in a case where glare processing has been performed on the screen, than a case where non-glare processing has been performed on the screen.

10. The calibration apparatus according to claim 9, further comprising:
a processing type acquisition unit configured to acquire processing type information indicating a type of surface processing performed on the screen; and
a processing type determination unit configured to determine whether glare processing has been performed on the screen or whether non-glare processing has been performed on the screen, based on the processing type information.

11. The calibration apparatus according to claim 1, further comprising:
a control unit configured to force-end the calibration of the display apparatus in a case where the measurement value determination unit determines that the first measurement value is not a value within the allowable range.

12. The calibration apparatus according to claim 1, further comprising:
a notification unit configured to notify a user of information on a determination result by the measurement value determination unit in a case where the measurement value determination unit determines that the first measurement value is not a value within the allowable range.

13. A method for controlling a calibration apparatus configured to execute calibration of a display apparatus, using a first measurement value, which is a measurement value of light from a screen of the display apparatus, the method comprising:
a first acquisition step of acquiring a first measurement value, which is a measurement value of light from the screen of the display apparatus;
a second acquisition step of acquiring a second measurement value, which is a measurement value of external light to the display apparatus;
an allowable range determination step of determining an allowable range of the first measurement value, based on the second measurement value acquired in the second acquisition step; and
a measurement value determination step of determining whether the first measurement value acquired in the first acquisition step is a value within the allowable range determined in the allowable range determination step,
wherein in the measurement value determination step, it is determined that the first measurement value is an inappropriate value in a case where the first measured value acquired in the first acquisition step is a value outside the allowable range determined in the allowable range determination step, and it is determined that the first measurement value is an appropriate value in a case where the first measurement value acquired in the first acquisition step is a value within the allowable range determined in the allowable range determination step.

14. The method for controlling the calibration apparatus according to claim 13, wherein
the second measurement value is a value to indicating brightness of the external light, and
in the allowable range determination step, it is determined that a wider allowable range as the external light is brighter.

15. The method for controlling the calibration apparatus according to claim 13, wherein
in the allowable range determination step, the allowable range is determined based on a target value of the first measurement value and the second measurement value acquired in the second acquisition step.

16. The method for controlling the calibration apparatus according to claim 15, wherein
the display apparatus is an apparatus configured to perform predetermined image processing on an image, and display the image after the predetermined image processing is performed, and
the method further comprises a target determination step determining a target value of the first measurement value, based on the predetermined image processing.

17. The method for controlling the calibration apparatus according to claim 16, wherein
the predetermined image processing includes gamma correction processing, and
in the target determination step, a target value of the first measurement value of gray is determined based on a gradation value of gray, a gradation value of white, a gamma value of the gamma correction processing, and a white target value, which is a target value of the first measurement value of the white.

18. The method for controlling the calibration apparatus according to claim 17, wherein
the white target value is a predetermined value.

19. The method for controlling the calibration apparatus according to claim 17, wherein
in the allowable range determination step, it is determined that a wider allowable range of the gray as the white target value is greater.

20. The method for controlling the calibration apparatus according to claim 13, wherein
the first measurement value is an XYZ tristimulus value, and
in the allowable range determination step, an allowable range for an X value, a Y value and a Z value respectively is determined based on the second measurement value.

21. The method for controlling the calibration apparatus according to claim 13, wherein
in the allowable range determination step, it is determined that a wider allowable range in a case where glare processing has been performed on the screen, than a case where non-glare processing has been performed on the screen.

22. The method for controlling the calibration apparatus according to claim 21, further comprising:
a processing type acquisition step acquiring processing type information indicating a type of surface processing performed on the screen; and
a processing type determination step determining whether glare processing has been performed on the screen or whether non-glare processing has been performed on the screen, based on the processing type information.

23. The method for controlling the calibration apparatus according to claim 13, further comprising:
a control step force-ending the calibration of the display apparatus in a case where it is determined that the first measurement value is not a value within the allowable range in the measurement value determination step.

24. The method for controlling the calibration apparatus according to claim 13, further comprising:
a notification step notifying a user of information on a determination result in the measurement value determination step in a case where it is determined that the first measurement value is not a value within the allowable range in the measurement value determination step.

25. A non-transitory computer readable medium that stores a program, wherein the program causes a computer to execute a method for controlling a calibration apparatus configured to execute calibration of a display apparatus, using a first measurement value, which is a measurement value of light from a screen of the display apparatus,
the method includes:
a first acquisition step of acquiring a first measurement value, which is a measurement value of light from the screen of the display apparatus;

a second acquisition step of acquiring a second measurement value, which is a measurement value of external light to the display apparatus;

an allowable range determination step of determining an allowable range of the first measurement value, based on the second measurement value acquired in the second acquisition step; and a measurement value determination step of determining whether the first measurement value acquired in the first acquisition step is a value within the allowable range determined in the allowable range determination step, and in the measurement value determination step, it is determined that the first measurement value is an inappropriate value in a case where the first measured value acquired in the first acquisition step is a value outside the allowable range determined in the allowable range determination step, and it is determined that the first measurement value is an appropriate value in a case where the first measurement value acquired in the first acquisition step is a value within the allowable range determined in the allowable range determination step.

* * * * *